April 14, 1925.

H. A. LEWIS

SLIP REGULATOR

Filed Aug. 28, 1922

WITNESSES:
T. H. Crock.
W. R. Coley

INVENTOR
Harry A. Lewis.
BY
Charles G. Barr
ATTORNEY

Patented Apr. 14, 1925.

1,533,253

UNITED STATES PATENT OFFICE.

HARRY A. LEWIS, OF NORRISTOWN, PENNSYLVANIA, ASSIGNOR TO WESTINGHOUSE ELECTRIC & MANUFACTURING COMPANY, A CORPORATION OF PENNSYLVANIA.

SLIP REGULATOR.

Application filed August 28, 1922. Serial No. 584,643.

*To all whom it may concern:*

Be it known that I, HARRY A. LEWIS, a citizen of the United States, and a resident of Norristown, in the county of Montgomery and State of Pennsylvania, have invented a new and useful Improvement in Slip Regulators, of which the following is a specification.

My invention relates to slip regulators or liquid rheostats, and it has particular relation to certain improved structural features thereof whereby a highly efficient and effective slip regulator or the like is provided.

One object of my invention is to provide a slip regulator or liquid rheostat wherein each stationary electrode is located in substantially vertical alinement with the movable electrode and is supported by a plurality of rods or the like that extend upwardly on opposite sides of the movable electrode.

Another object of my invention is to provide an electrode arrangement of the character just set forth wherein the metallic supporting or suspending rods are covered by unitary insulating means, in order that the path of the electric current in the rheostat may be substantially confined to the space between the movable electrode and the main working member or plate of the stationary electrode.

A further object of my invention is to provide a novel construction whereby the above-described stationary electrodes may be satisfactorily supported by, and insulated from, the rheostat tank without interfering with the assembly or operation of the other necessary parts of the slip regulator.

Still another object of my invention is to provide a tank or container for a body of electrolyte in which a plurality of sets of co-operating stationary and movable electrodes are respectively enclosed by cylindrical members, such as the well-known sewer tiles, to separate the electrodes corresponding to the respective phases of the electric circuit and, at the same time, to eliminate the possibility of loss or leakage of the electrolyte from the cylindrical members, inasmuch as the electrolyte is provided both within and surrounding the sewer tiles.

Another object of my invention is to provide, in conjunction with the familiar torque motor for operating the movable electrodes, an automatically adjustable counterweight, whereby the dead weight or pull of the counterweight is automatically increased or decreased in accordance with the position of the movable electrode. In this way, the action of the torque motor is retarded in case a sudden load is imposed upon the main motor that is regulated by the slip regulator and also, on the other hand, the torque motor is assisted in causing the electrodes to come together more quickly and thus facilitate the return of the main motor to normal speed.

A further object of my invention is to provide a novel type of cooling tank which will effectively perform its desired function without interference with the normal action of the electrolyte and be practically portable, being readily removed for repairs or replacement.

Other objects of my invention will become evident from the following description, taken in conjunction with the accompanying drawings, wherein—

Figure 1:
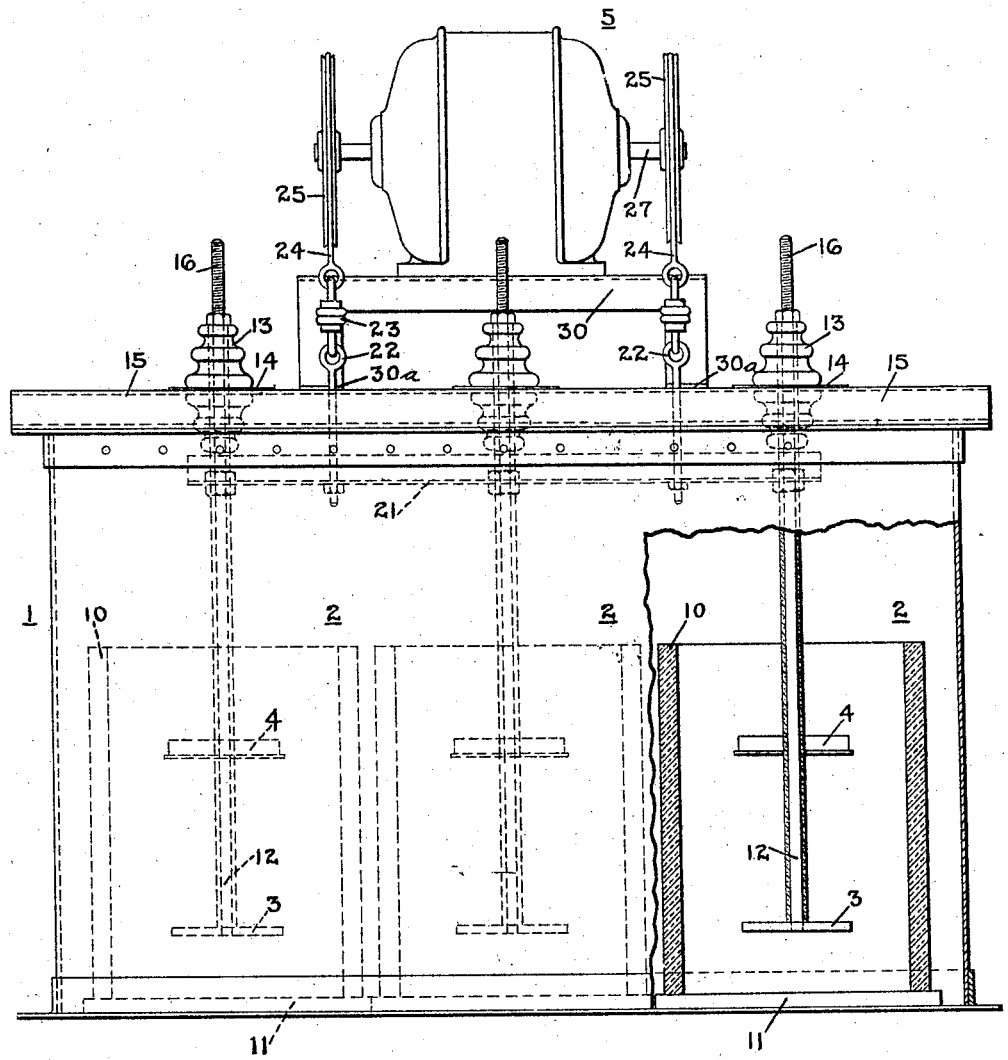
Figure 1 is a view, in front elevation, of a liquid rheostat constructed and arranged in accordance with my present invention.
Figure 2:
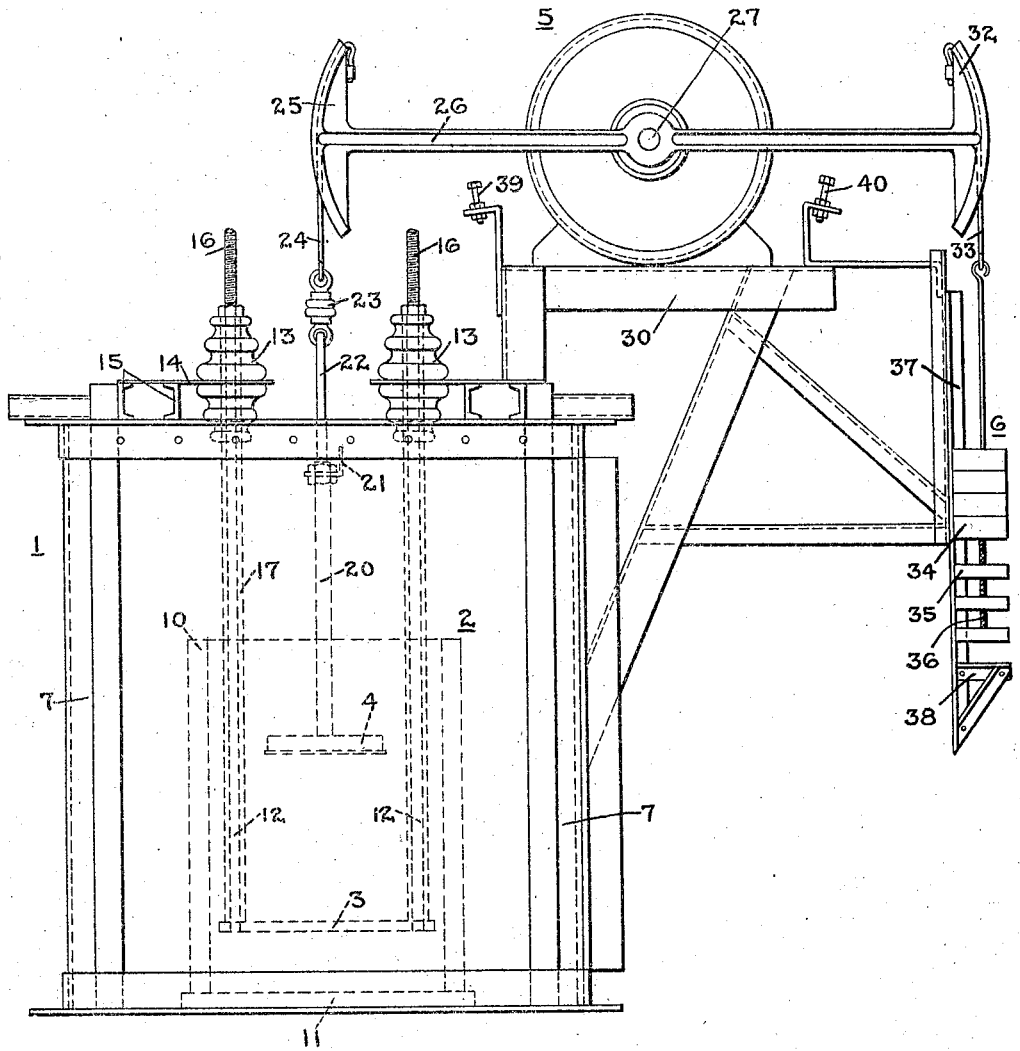
Fig. 2 is a view, in side elevation, of the structure that is shown in Fig. 1.

Referring to the drawings, the structure here shown comprises a rectangular tank that is preferably constructed from five steel plates constituting the four sides and the bottom thereof, suitable angle irons being located at all abutting edges and also at the top edges for lending ruggedness and rigidity to the entire structure. Inasmuch as the particular construction of the electrolyte-container or tank is not relevant to the present invention, no further description thereof is deemed necessary. Within the tank 1, a plurality of sets of co-operating electrodes 2, corresponding to the respective phases of the secondary winding of the induction motor or other apparatus to be regulated, are located, each set of electrodes including a lower stationary electrode 3 and an upper movable electrode 4.

A torque motor 5, of a familiar type, is located above and to one side of the tank 1 for the purpose of operating the movable electrodes 4. An adjustable counterweight device 6 is attached to the operating member of the torque motor 5, as subsequently described in detail.

For the purpose of suitably cooling the body of electrolyte within the tank 1, a pair of cooling tanks 7, shown in detail in Figs. 4 and 5, extend longitudinally of the tank 1, as hereinafter more fully set forth.

Surrounding each pair of co-operating stationary and movable electrodes 3 and 4, respectively, is a cylindrical insulating member 10, preferably comprising a selected length of earthenware pipe, such as the familiar sewer tile, each tile resting upon a base 11 of slate, or other suitable material, the three bases being disposed in abutting relation and together extending for nearly the full length of the tank. In this way, the respective sets of electrodes are suitably spaced and electrically separated from each other, although, since the body of electrolyte in the tank 1 is normally of a height greater than that of the several sewer tiles, equal pressures obtain both within and without the cylindrical tiles, whereby loss and leakage of electrolyte from within the same is automatically eliminated or compensated for under all conditions. Thus, the difficulty that has been encountered in various rheostats of the prior art, wherein the cylindrical containing members were not surrounded by electrolyte, is completely obviated.

Each stationary electrode 3 comprises a bottom or working plate member, the two opposite sides of which are drilled for the reception of a pair of metallic rods 12 that extend upwardly from the working member on opposite sides of the corresponding movable electrode 4, which is located in substantially vertical alinement with the working member of the stationary electrode 3.

For the purpose of suitably supporting and insulating the stationary electrodes 3 from the tank 1, a plurality of porcelain insulators 13, or the like, are suspended, by means of small plates or sheets 14, of metal, which are suitably secured to a pair of channel irons 15 that rest upon upper edges of the tank and extend for the full length thereof with respect to the longest dimension of the tank. The rods 12 terminate above the insulators 13 in suitable terminal or connecting members 16, which may be electrically secured, in any suitable manner, to the terminals of the induction motor or any other machine to be regulated.

Figure 3:
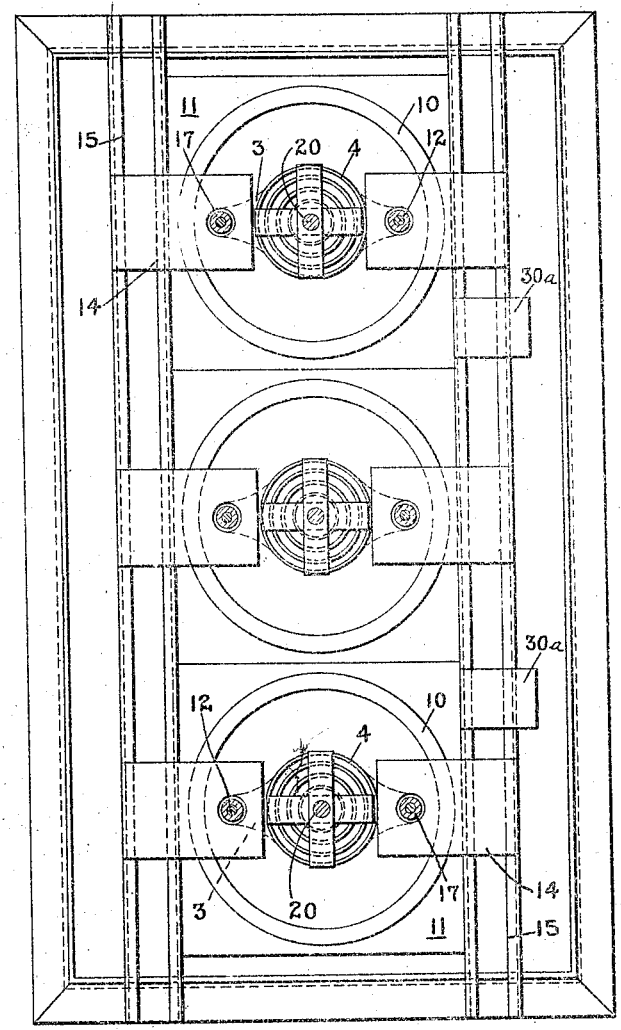
Fig. 3 is a plan view, with certain parts cut away, for the sake of clearness, of my slip regulator.

Each movable electrode 4 is preferably of the type set forth and claimed in Patent No. 1,248,495, issued to Geo. W. Huey on Dec. 4, 1917, and assigned to the Westinghouse Electric & Manufacturing Company. In general, the movable electrode comprises a plurality of concentric rings that are supported by two cross bars extending at right angles, as best shown in Fig. 3. It will be understood, however, that any other suitable type of movable electrode may be employed in lieu of that herein illustrated.

A rod 20 is secured centrally of each movable electrode 4 and extends upwardly to an angle iron 21 that runs longitudinally of the tank for the purpose of supporting the three movable electrodes that are located therein. At points intermediate the respective pairs of rods 20, a plurality of eye bolts 22 are attached to the angle iron 21. By means of suitable strain insulators 23, the eye bolts 22 are respectively connected to ropes or cables 24 that are adapted to wind and unwind over a sheave-like end portion 25 of the one or the other of two operating levers 26 that are actuated by means of the torque motor 5.

The torque motor 5 is mounted to one side of, and above, the tank 1, resting upon a suitable platform 30, constructed from angle irons or the like that are suitably secured to a plurality of plate members 30ᵃ, which rest upon, and are attached to, one pair of the channel irons 15.

In accordance with customary practice, each lever arm 26 is rigidly mounted upon the operating shaft 27 of the torque motor 5, and the end of each operating lever opposite to the end that supports the movable electrode 4 is provided with a second sheave-like member 32 for guiding a rope or cable 33 that is attached to the upper end of the counterweight 6. The counterweight 6 comprises a suitable number of relatively heavy disks or weight members 34 that are permanently attached to a suitable rope or cable. Below the main counterweight members 34 are suspended a plurality of spaced counterweight members 35, of smaller dimensions, and which are attached to a rope or other flexible member 36. For the purpose of suitably guiding the vertical movements of the several counterweights, a guide member 37, constructed from angle irons or the like, is provided, being suitably located near, and secured to, the platform 30 of the torque motor 5. Below the illustrated position of the last counterweight member 35 is disposed a shelf or ledge 38 for a purpose to be set forth.

A plurality of adjustable stop members 39 and 40 are attached to opposite sides of the platform 30, being employed for the usual purpose of limiting the rocking movements of the levers 26.

The cooling tanks 7 severally comprise longitudinally-extending side plates 45 and 46 that are welded or otherwise suitably secured to vertical end plates 47, and a bottom plate 48, the proportion of parts being such that a relatively long and deep but narrow tank or trough, open at the top, is provided.

Figure 4:
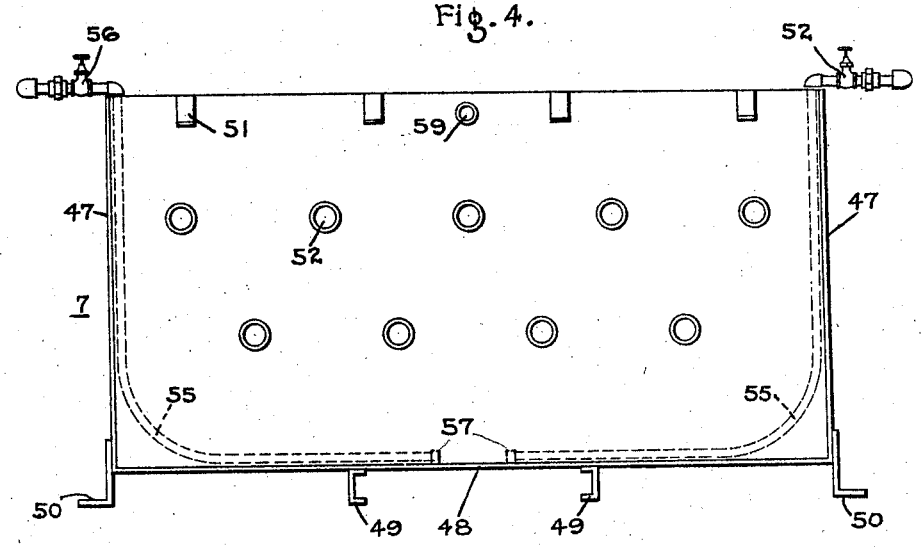
Figs. 4 and 5 are views, in elevation and in plan, respectively, of the cooling tanks that are employed in connection with the liquid rheostat illustrated in the previous figures.
Figure 5:
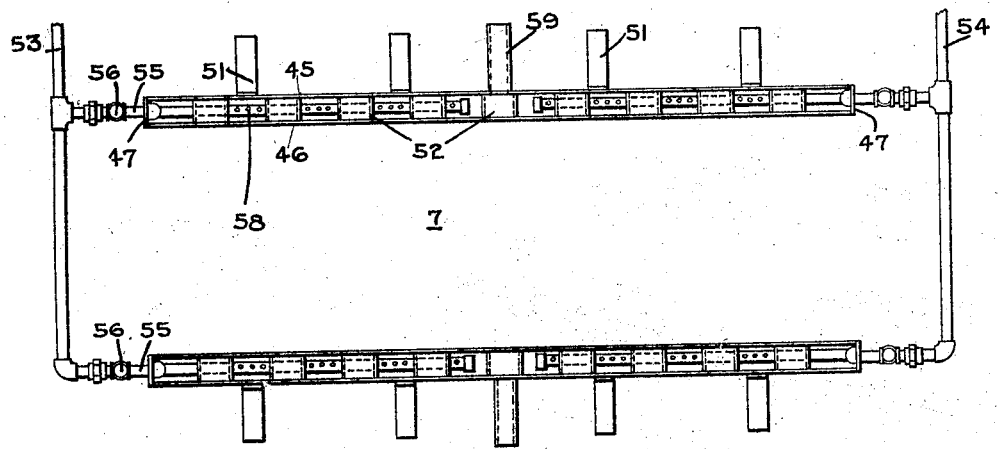

For the purpose of supporting each of the cooling tanks in position within the main tank 1, a plurality of channel irons 49 and angle irons 50 are secured to the lower face of each cooling tank, as clearly illustrated in Fig. 4. In addition, a plurality of angle-iron sections 51 extend laterally of each cooling tank on the outer side thereof and are adapted to rest upon the upper edges of the corresponding sides of the main tank 1.

A plurality of short-pipe sections 52 pierce each of the cooling tanks, being suitably welded to the side members thereof. In this way, the cooling medium that circulates through each of the tanks 7 is adapted to directly convey away or dissipate the heat that is produced in the electrolyte by reason of the intimate contact thereof with the various pipe sections 52, as well as with the faces proper of the cooling tanks.

For the purpose of admitting a cooling fluid or other medium to each of the cooling tanks, inlet pipes or conduits 53 and 54 are provided near the opposite ends of the tanks, being connected thereto by means of distributing or branch pipes 55, each of which is provided with a suitable manually-operable valve 56. Each of the pipes 55 runs downwardly inside one of the cooling tanks 7 near one end plate 47 thereof and is bent to also run along the base or bottom plate 48. Each pipe terminates in a cap or closure 57 near the middle portion of the cooling tank. For the purpose of effecting an adequate circulation of the cooling medium, the horizontal portion of each pipe 55 is provided with a plurality of small holes or perforations 58, as illustrated in Fig. 5.

Near the top of each cooling tank 7 on the outer face thereof, a relatively large outlet pipe 59 is provided whereby the heated liquid, as it rises to the top of the cooling tank, is conveyed away through the pipe 59 to be discharged in any suitable manner. It will be evident that any desired source of fluid pressure may be connected to the inlet pipes 53 and 54 since no direct contact with the electrolyte in the main tank 1 occurs, but a continuous circulation or flow of the cooling medium from the bottom of each cooling tank to the top thereof takes place whereby the surrounding body of electrolyte is effectively cooled.

Each cooling tank 7 is thus readily portable, which is of great advantage in assembling the slip regulator, and also in the case of repairs or replacements.

The operation of my slip regulator may be set forth as follows: After connection of the various terminal members 16 to the terminal members of the induction motor or other device to be regulated, movement of the torque motor 5 serves to automatically vary the resistance in the circuit of the secondary winding of the induction motor by causing the movable electrodes 4 to approach or recede from the respective stationary electrodes 3. This general principle of operation is well known to those skilled in the art and no further description thereof is considered necessary.

Attention is particularly directed to the fact that, although each set of stationary and co-operating movable contact members is surrounded by the earthenware barrels or tile members 10 for providing the most effective operation of the rheostat, nevertheless the rheostat will operate even if one of the tile members is broken or, in the extreme case, if the two outer tile members are both broken. It is evident that no such operation is possible in slip regulators embodying separate chambers or compartments for the respective sets of electrodes, which compartments are not submerged in a body of electrolyte.

The action of the set of counterweights 6 also constitutes a valuable feature of my present invention. As the electrodes are separated by the action of the torque motor, the various counterweights are lowered until the lowest weight 35 rests upon the shelf or ledge 38. By reason of the flexibility of the rope or cable 36, the effective weight of the counterpoise 6 is reduced to the extent of the weight of the member in question. Upon further separation of the electrodes and consequent lowering of the counterpoise, additional weight members 35 are rendered ineffective by reason of piling up on the shelf 38. In case the electrodes are caused to approach each other, the opposite action, that is, a gradual increase of the effective weight of the counterpoise 6, is, of course, produced.

The advantages of this construction may be set forth as follows: Whenever an increase in load upon the motor being regulated occurs, the action of the torque motor causes the electrodes to be separated, whereby the gradual decrease in the effective weight of the counterpoise 6 takes place, as previously described. In this way, a greater electrical load is imposed upon the torque motor, whereby the action thereof is damped or retarded to prevent the torque motor from overshooting the desired stabilizing position, especially in the event of a sudden increase in load upon the main motor.

On the other hand, the gradual increase in the effective weight of the counterpoise 6 as the electrodes are caused to approach each other, allows the torque motor to increase in speed, thus effecting a more rapid approach of the pairs of electrode members and facilitating the return to normal speed of the main motor being regulated. In other words, the torque motor is adapted to more quickly effect an approach of the electrodes to reduce the secondary resistance in the main-motor circuit and, consequently, more quickly return power into the fly-wheel of the main-motor set, so that the load is taken off the fly wheel in case of heavy peaks and the tendency of the motor to carry loads which the fly wheel should carry is reduced.

I have thus produced a liquid rheostat or slip regulator that is rugged in construction, efficient in operation, by reason of the elimination of the electrolyte losses and leakage, that is effectively cooled by means of portable cooling tanks and that automatically functions to reduce the speed of separation of the co-operating electrodes and increase the speed of approach thereof for the purposes set forth.

I do not wish to be restricted to the specific details of construction or arrangement of parts herein set forth, as various modifications thereof may be effected without departing from the spirit and scope of my invention. I desire, therefore, that only such limitations shall be imposed as are indicated by the appended claims.

I claim as my invention:—

1. A liquid rheostat embodying a movable electrode and a co-operating stationary electrode comprising a working member located opposite said movable electrode and a plurality of supporting members disposed on opposite sides of the movable electrode.

2. A liquid rheostat embodying a movably suspended electrode and a co-operating stationary electrode comprising a working member located in substantially vertical alinement with said movable electrode and a plurality of suspending members extending on opposite sides of the movable electrode.

3. A liquid rheostat embodying a movably suspended electrode and a co-operating stationary electrode comprising a working member located directly below said movable electrode and a plurality of suspending rods extending upwardly on opposite sides of the movable electrode.

4. A liquid rheostat embodying a movable electrode and a co-operating stationary electrode comprising a metallic member located opposite said movable electrode, a plurality of metallic supporting members disposed on opposite sides of the movable electrode, and insulating covering means for said supporting members.

5. A liquid rheostat embodying a movably suspended electrode and a co-operating stationary electrode comprising a metallic member located in substantially vertical alinement with said movable electrode, a plurality of suspending members extending on opposite sides of the movable electrode, and unitary insulating means surrounding each of said suspending members.

6. A liquid rheostat embodying a movably suspended electrode and a co-operating stationary electrode comprising a metallic member located directly below said movable electrode, a plurality of suspending rods extending upwardly on opposite sides of the movable electrode, and a plurality of tubular insulating members severally enclosing said suspending rods.

7. A liquid rheostat embodying a movable electrode and a co-operating stationary electrode comprising a metallic member located opposite said movable electrode, a plurality of metallic supporting members disposed on opposite sides of the movable electrode, and means for restricting the electric current path substantially to the space between said movable electrode and the first-named metallic member.

8. A liquid rheostat embodying a movably suspended electrode and a co-operating stationary electrode comprising a metallic member located in substantially vertical alinement with said movable electrode, a plurality of suspending members extending on opposite sides of the movable electrode, and means for restricting the electric current path substantially to the space between said movable electrode and said metallic member.

9. A liquid rheostat embodying a movably suspended electrode and a co-operating stationary electrode comprising a metallic member located directly below said movable electrode, a plurality of suspending rods extending upwardly on opposite sides of the movable electrode, and insulating means for restricting the electric current path substantially to the space between said movable electrode and said metallic member.

10. A liquid rheostat comprising a tank, a plurality of stationary electrode members disposed therein, a supporting member extending along the top of said tank near one edge thereof, and means for suspending said electrode members from said supporting member.

11. A liquid rheostat comprising a tank, a plurality of stationary electrode members disposed therein, a plurality of supporting members extending along the top of said tank near opposite edges thereof, and means for suspending said electrode members from each of said supporting members.

12. A liquid rheostat comprising a tank, a plurality of stationary electrode members disposed therein, a supporting member extending along the top of said tank near one edge thereof, a plurality of plate members extending at substantially right angles and secured to said supporting members, and a plurality of insulating members severally supported by said plate members and in turn severally supporting said electrode members.

13. A liquid rheostat comprising a tank, a plurality of stationary electrode members disposed therein, a plurality of supporting members extending along the top of said tank near opposite edges thereof, a plurality of plate members, oppositely disposed in pairs, extending at substantially right angles and secured to the one or the other of said supporting members, and a plurality of insulating members severally supported by said plate members and in turn acting in pairs to support the respective electrode members.

14. A liquid rheostat comprising a tank, a plurality of stationary electrodes disposed therein, and means comprising a plurality of closed barriers surrounding the respective electrodes and themselves immersed in the liquid within said tank.

15. A liquid rheostat comprising a tank, a plurality of stationary electrodes disposed therein, a plurality of movable electrodes located in substantially vertical alinement with the respective stationary electrodes, and a closed barrier of insulating material surrounding each pair of co-operating electrodes and itself immersed in the liquid within said tank.

16. A liquid rheostat comprising a tank, a plurality of stationary electrodes disposed therein, a plurality of movable electrodes located in substantially vertical alinement with the respective stationary electrodes, a cylindrical earthenware barrier enclosing each pair of co-operating electrodes and itself immersed in the liquid within said tank, and a closure of insulating material for the lower end of each barrier resting upon the floor of said tank.

17. A liquid rheostat comprising a movable electrode, means for operating said electrode, and a counterweight for said electrode, the effective weight of which while operating in a single medium is dependent upon the position of said electrode.

18. A liquid rheostat comprising a movable electrode, means for operating said electrode, and a counterweight for said electrode comprising a plurality of weights suspended on a flexible member, and means for successively removing the pull of said weights on said flexible member as the position of said electrode varies.

19. A liquid rheostat comprising a movable electrode, means for operating said electrode, a counterweight for said electrode, and means for varying the effective weight of said counterweight while operating in a single medium in accordance with the position thereof.

20. A liquid rheostat comprising a movable electrode, means for operating said electrode, a counterweight for said electrode comprising a plurality of weights suspended and spaced apart on a flexible member, and a stationary shelf for successively arresting the downward progress of said weight.

21. A liquid rheostat comprising a movable electrode, means for operating said electrode, a counterweight for said electrode comprising a plurality of weights suspended and spaced apart on a flexible member, a vertical guide member for said weights, and a stationary shelf upon which said weights may successively rest as the electrode moves within predetermined limits.

22. The combination with a movable member and actuating means therefor, of a counterweight for said movable member, the effective weight of which while operating in a single medium is dependent upon the position of said movable member.

23. The combination with a movable member and actuating means therefor, of a counterweight for said movable member, the effective weight of which while operating in a single medium respectively increases and decreases as it is moved upwardly and downwardly.

24. A liquid rheostat comprising a movable electrode member, a torque motor for actuating said movable member, and a counterweight for said movable member automatically operative to retard the movement of the movable member in one direction and expedite it in the other direction.

25. A liquid rheostat comprising a stationary and a movable electrode member, a torque motor for actuating said movable member, and a counterweight automatically operative to retard the separation and expedite the approach of the movable electrode member with respect to the stationary electrode member.

26. A liquid rheostat comprising a stationary and a movable electrode member, a torque motor for actuating said movable member, and a counterweight automatically operative to increase or decrease the load on said torque motor in accordance with the direction of operation thereof.

27. A liquid rheostat comprising a stationary and a movable electrode member, a torque motor for actuating said movable member, and a counterweight automatically operative to increase the load on said torque motor when the electrodes are separating and to decrease such load when the electrodes are coming together.

28. An electrode for liquid rheostats comprising a working member extending in a substantially horizontal plane, a plurality of substantially vertical metallic supporting members secured to opposite sides of said working member, and unitary insulating means enclosing the respective supporting members.

29. A liquid rheostat comprising a container for electrolyte and a portable cooling tank suspended from an upper edge of said container.

30. A liquid rheostat comprising a container for electrolyte, a portable cooling tank supported by said container, and means for circulating a cooling medium through said tank.

31. A liquid rheostat comprising a container for electrolyte, and a relatively flat cooling tank suspended therewithin and having a plurality of passages therethrough for effecting intimate contact with said electrolyte.

32. A liquid rheostat comprising a container for electrolyte, and a relatively deep and narrow trough suspended therewithin and having a plurality of passages extending therethrough in the direction of the narrow dimension for effecting intimate contact with said electrolyte.

33. A liquid rheostat comprising a container for electrolyte, a relatively deep and narrow trough suspended therewithin, and a perforated pipe extending near the bottom of said trough for circulating a cooling medium upwardly therethrough.

34. A liquid rheostat comprising a container for electrolyte, a pair of cooling tanks suspended from opposite sides of said container, and pipe connections for supplying a cooling medium to corresponding parts of said tank, and means for independently regulating the flow of said medium to said tanks.

35. A liquid rheostat comprising a container for electrolyte, a pair of relatively flat cooling tanks severally having a plurality of projections on one side for resting upon opposite upper edges of said container, and means for supplying a cooling medium to the corresponding ends of said tanks.

36. A liquid rheostat comprising a container for electrolyte, a pair of relatively deep and narrow troughs provided with projections in the direction of the narrow dimension for resting upon opposite upper edges of said container, and cooling fluid-conveying means connecting the corresponding ends of said troughs.

37. A liquid rheostat comprising a container for electrolyte, a pair of relatively deep and narrow troughs provided with projections in the direction of the narrow dimension for resting upon opposite upper edges of said container, pipe members for connecting corresponding ends of said tanks, and a plurality of perforated pipes extending from each side along the bottom of each trough for circulating a cooling medium upwardly therethrough.

In testimony whereof, I have hereunto subscribed my name this 7th day of August, 1922.

HARRY A. LEWIS.